(12) United States Patent
Kulkarni et al.

(10) Patent No.: US 10,291,776 B2
(45) Date of Patent: May 14, 2019

(54) INTERACTIVE VOICE RESPONSE SYSTEM CRAWLER

(71) Applicant: Cyara Solutions Pty Ltd, Hawthorn, Vic (AU)

(72) Inventors: Alok Kulkarni, Glen Iris (AU); Geoff Willshire, Greenslopes (AU); Ian Ng, New York, NY (US); Thomas Fejes, Freshwater (AU)

(73) Assignee: CYARA SOLUTIONS PTY LTD, Hawthorn, Vic (AU)

( * ) Notice: Subject to any disclaimer, the term of this patent is extended or adjusted under 35 U.S.C. 154(b) by 341 days.

(21) Appl. No.: 15/091,556

(22) Filed: Apr. 5, 2016

(65) Prior Publication Data
US 2016/0227034 A1 Aug. 4, 2016

Related U.S. Application Data

(63) Continuation-in-part of application No. 14/590,972, filed on Jan. 6, 2015, now Pat. No. 10,091,356.

(51) Int. Cl.
| | |
|---|---|
| *H04M 3/493* | (2006.01) |
| *H04M 7/12* | (2006.01) |
| *H04M 3/24* | (2006.01) |
| *G10L 15/22* | (2006.01) |

(52) U.S. Cl.
CPC ............ *H04M 3/493* (2013.01); *G10L 15/22* (2013.01); *H04M 3/24* (2013.01); *H04M 3/4938* (2013.01); *H04M 7/1295* (2013.01)

(58) Field of Classification Search
CPC .. H04M 3/2236; H04M 3/493; H04M 3/5166; H04M 3/527; G06F 17/2785
USPC .. 379/1.02, 32.01, 88.01, 88.18, 93.01, 235, 379/265.09, 266.08, 88.11, 265.12; 704/270.1; 705/1.1, 4, 7.15, 14.54; 709/200, 231, 246; 714/27, 38.1, 38.14; 707/709; 715/200, 716; 717/130; 726/25
See application file for complete search history.

(56) References Cited

U.S. PATENT DOCUMENTS

| | | | | |
|---|---|---|---|---|
| 7,373,300 | B1 * | 5/2008 | Bangalore | G06F 17/27 704/257 |
| 7,415,537 | B1 * | 8/2008 | Maes | G06F 17/30905 709/246 |
| 9,883,026 | B2 * | 1/2018 | Aldecoa | G10L 13/033 |
| 9,900,438 | B1 * | 2/2018 | Hollenberg | G10L 15/22 |
| 2003/0115066 | A1 * | 6/2003 | Seeley | H04M 3/24 704/270.1 |
| 2003/0212561 | A1 * | 11/2003 | Williams | H04M 3/24 704/270.1 |
| 2004/0008825 | A1 * | 1/2004 | Seeley | H04M 3/22 379/32.01 |
| 2004/0047453 | A1 * | 3/2004 | Fraser | H04M 3/493 379/88.18 |

(Continued)

*Primary Examiner* — Gerald Gauthier
(74) *Attorney, Agent, or Firm* — Brian R. Galvin; Galvin Patent Law, LLC

(57) ABSTRACT

A system for interactive voice response system crawling, comprising an IVR crawler that may be VXML, design specification, DTMF or ASR/NLSR speech-based in nature and traverses an IVR menu to discover possible interaction paths and produces test cases based on those paths, and a database that stores test cases produced by the IVR crawler during operation, and a method for using an IVR crawler to perform a system migration.

23 Claims, 10 Drawing Sheets

(56) References Cited

U.S. PATENT DOCUMENTS

| | | | | |
|---|---|---|---|---|
| 2005/0251863 A1* | 11/2005 | Sima | G06F 21/577 | 726/25 |
| 2006/0117222 A1* | 6/2006 | Shen | G06F 8/31 | 714/38.14 |
| 2006/0282494 A1* | 12/2006 | Sima | H04L 63/12 | 709/200 |
| 2007/0140466 A1* | 6/2007 | Sharma | H04M 3/24 | 379/235 |
| 2007/0192113 A1* | 8/2007 | Sadowski | G06Q 10/06 | 705/1.1 |
| 2007/0263834 A1* | 11/2007 | Jensen | H04M 3/24 | 379/235 |
| 2008/0065974 A1* | 3/2008 | Campbell | G06F 17/248 | 715/200 |
| 2008/0112542 A1* | 5/2008 | Sharma | H04M 3/242 | 379/1.02 |
| 2008/0144786 A1* | 6/2008 | Wang | H04L 12/66 | 379/88.18 |
| 2009/0076823 A1* | 3/2009 | Collins | G10L 15/22 | 704/270.1 |
| 2011/0145641 A1* | 6/2011 | Evans | G06F 11/3688 | 714/27 |
| 2011/0150189 A1* | 6/2011 | Kulkarni | H04M 3/323 | 379/32.01 |
| 2011/0283190 A1* | 11/2011 | Poltorak | G10L 13/033 | 715/716 |
| 2012/0148032 A1* | 6/2012 | Blanchard | G10L 15/22 | 379/88.11 |
| 2012/0300921 A1* | 11/2012 | Jennings | H04M 3/5232 | 379/265.12 |
| 2013/0142317 A1* | 6/2013 | Reynolds | H04L 29/06027 | 379/88.01 |
| 2014/0181591 A1* | 6/2014 | Bijanki | G06F 11/3684 | 714/38.1 |
| 2015/0095305 A1* | 4/2015 | Tripp | G06F 17/30864 | 707/709 |
| 2015/0181037 A1* | 6/2015 | Bailey | G06Q 40/08 | 705/4 |
| 2015/0235163 A1* | 8/2015 | Gupta | G06Q 10/063114 | 705/7.15 |
| 2016/0050317 A1* | 2/2016 | Natesan | H04M 3/493 | 379/88.01 |
| 2016/0062876 A1* | 3/2016 | Narayanan | G06F 11/3684 | 717/130 |
| 2016/0065637 A1* | 3/2016 | O'Malley | H04L 67/306 | 709/231 |
| 2016/0065739 A1* | 3/2016 | Brimshan | H04M 3/5231 | 379/88.01 |
| 2016/0086225 A1* | 3/2016 | Liu | G06F 17/30864 | 705/14.54 |
| 2017/0293610 A1* | 10/2017 | Tran | G06F 17/279 | |
| 2018/0146090 A1* | 5/2018 | Lavian | H04M 3/493 | |

* cited by examiner

INTERACTIVE VOICE RESPONSE SYSTEM CRAWLER

CROSS-REFERENCE TO RELATED APPLICATIONS

This application is a continuation-in-part of U.S. patent application Ser. No. 14/590,972, titled "INTERACTIVE VOICE RESPONSE SYSTEM CRAWLER" and filed on Jan. 6, 2015, the entire specification of which is hereby incorporated by reference in its entirety.

BACKGROUND OF THE INVENTION

Field of the Art

The disclosure relates to the field of contact center operations, and more particularly to the field of interactive voice response systems and applications.

Discussion of the State of the Art

In the field of interactive voice response (IVR) systems, documenting systems "as-is", or in their current state such as to document possible voice responses and interaction paths a customer might take while navigating a system, can be very time consuming, sometimes requiring as much as 3-9 months to completely document a single system. Consequently, documentation is often out of sync with production systems due to the time and resources required, decreasing the effectiveness of the documentation. Generating documentation scripts manually can also be time consuming, making it difficult to economize the process. The result of these factors is that agility is compromised, and time-to-value can be over a year.

Additionally, outdated or poorly maintained IVR software may persist in use due to difficulty migrating to new systems or performing maintenance manually (for example, to identify broken paths or outdated options that need to be fixed or removed). Companies may have a large investment in a particular IVR configuration, and may wish to maintain their existing setup but also to take advantage of new technologies that may become available. Generally, this would require manually setting up a new IVR system and taking care to configure it in a similar manner to the existing configuration. Manually inspecting or setting up a new IVR system is time consuming and error-prone, which leads to outdated systems being kept operational rather than upgrading, due to the investment required. It is also important for users to be able to perform minor changes without the risk of causing larger issues, for example to enable users to correct minor issues as they appear without running the risk of breaking larger call flows.

What is needed, is a means to rapidly and reliably generate documentation of, and test cases for, production IVR systems to at least accelerate deployment and time-to-value (for example, for existing systems), as well as to generate VXML suitable for rapid importation into an IVR system, and to generate interactive IVR documentation to enable users to view and modify an IVR in a safe and efficient manner.

SUMMARY OF THE INVENTION

Accordingly, the inventor has conceived and reduced to practice, in a preferred embodiment of the invention, various systems and methods for live IVR system crawling, adapted for use in migrating an IVR configuration to a new system as an upgrade or replacement.

According to a preferred embodiment of the invention, a system for IVR crawling comprising a speech crawler that may be a VXML-based crawler stored and operating on a network-connected computing device (such as a server or a desktop workstation), a DTMF or ASR/NLSR crawler that may be a touch-tone or speaker simulation based interaction program, a design crawler that may be a spreadsheet-based software crawler, a call flow database that may store and provide call flow documentation or records such as those generated by the crawlers of the invention, a test executive engine that may perform call flow testing according to known call flow records, and a test results analyzer that may perform analysis of the results of performed call flow tests such as to determine the performance of an IVR or the accuracy of a call flow documentation record, is disclosed. According to the embodiment, a speech crawler (SAC) may be a process that interrogates a target VXML browser, reverse engineers any discovered call flows by parsing each branch of the VXML application (such as by providing all possible inputs at all possible layers) and builds a complete test case library that may be used by an automated testing solution to exhaustively test all possible paths through an interrogated IVR. The input may be the URL of the target VXML browser and the output may be a file containing the test cases in XML format, such as for storing in a database or adding to documentation files.

A DTMF crawler (DC) may be a process that interrogates a target touch tone IVR or IVRs that aren't VXML compliant or who's VXML interface is not directly accessible by placing actual telephone calls to an IVR from the crawler platform. The crawler may then, as described previously, reverse engineer any discovered call flows such as by parsing each and every branch of the application by providing all possible DTMF inputs at all possible layers, and may then build a complete test case library. This solution includes use of transcription to convert audio to text for the test cases, for example by using automated voice recognition so that the software-based crawler may parse and respond to heard voice prompts from the IVR via the telephone call. The input may be a phone number, or multiple numbers (internal or external, such as for testing internal IVR applications or remotely testing external IVRs from outside the internal telephone network), and the output may be a library of test cases or a diagrammatic representation of the IVR application structure suitable for adding to documentation or storing in a database.

An automated or natural language speech recognition (ASR/NLSR) Crawler (ASC) may be a process that interrogates a target speech recognition IVR or IVRs that aren't VXML compliant or who's VXML interface is not directly accessible by placing actual telephone calls to an IVR from the crawler platform. The crawler may then, as described previously, reverse engineer any discovered call flows such as by parsing each and every branch of the speech application by providing all possible speech inputs at all possible layers, and may then build a complete test case library. This solution includes use of transcription to convert audio to text for the test cases, for example by using automated voice recognition so that the software-based crawler may parse and respond to heard voice prompts from the IVR via the telephone call. The input may be a phone number, or multiple numbers (internal or external, such as for testing internal IVR applications or remotely testing external IVRs from outside the internal telephone network), and the output may be a library of test cases or a diagrammatic representation of the IVR application structure suitable for adding to documentation or storing in a database.

A design crawler may be a process that interrogates any standard speech application design template used commonly in the art to build a complete library of test cases for the speech/DTMF application. In such an arrangement, the crawler may traverse a design document such as a spreadsheet, and as described previously may reverse engineer any discovered flows from the document and output a test case library suitable for incorporation into either a database or IVR documentation, or both.

It should be appreciated that the system of the invention may incorporate multiple crawlers and crawler types such as those described above, interchangeably or simultaneously as may be desirable for a particular arrangement or application.

Two exemplary use cases for the crawlers described above are as follows.

Use Case 1: Using the Speech Crawler. User launches the application using the command line interface.
  Input: User enters the URL of the VXML browser to be reverse engineered and the parent folder name of the Test Case library and presses 'Enter' key.
  <application runs>
  Output: XML file with the name of the parent folder with sub folders and test cases within each folder as necessary.

Use Case 2: Importing the Test Cases XML. As per normal import procedure however the entire library of the Test Cases is imported with the directory structure intact.

According to another preferred embodiment of the invention, a method for reverse engineering an IVR using a plurality of IVR crawling software applications such as those described previously, is disclosed. According to the embodiment, the method may utilize various IVR crawlers such as those described in the system of the invention above, for example crawlers that may be VXML, DTMF, Speech or design-based in nature or operation. In an initial step, a crawler may access IVR information according to its specific nature, such as a VXML-based crawler loading a VXML script such as from a URL or stored file, or a DTMF/Speech-based crawler placing a telephone call directly to an IVR system. In a next step, the crawler may "crawl", or reverse engineer the IVR information, such as by iteratively or recursively traversing a conversation path, or by exploring every potential path in a data file (such as with VXML-based crawlers). In a next step, the crawler may then add new call test cases to a testing database, and in a next step stored test cases may be retrieved by a test case execution engine, which may then execute the test cases in a next step. In a next step, the results of test case execution may be analyzed, and these test results may then be stored in a database for further reference in a next step. In an optional final step, test results may be presented for manual review, such as by a human analyst performing tests manually or reviewing the results of prior tests to review operation.

According to another preferred embodiment of the invention, a method for interactive voice response system migration, comprising the steps of: accessing, via an IVR crawler, an IVR system; reverse engineering the menu paths of the IVR system; producing a plurality of VXML data corresponding to at least a portion of the menu paths of the IVR system; and importing at least a portion of the plurality of VXML data into an IVR system, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
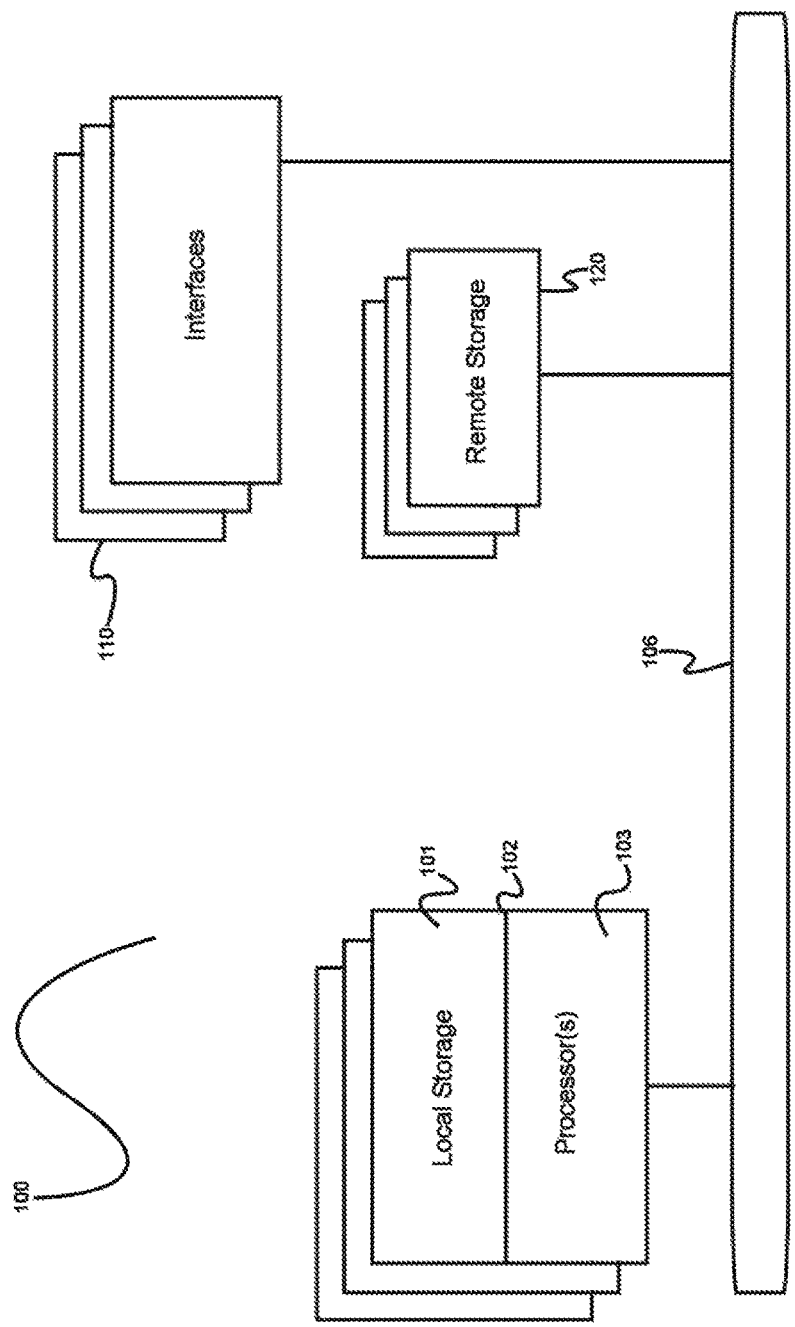
FIG. 1 is a block diagram illustrating an exemplary hardware architecture of a computing device used in an embodiment of the invention.

The inventor has conceived, and reduced to practice, in a preferred embodiment of the invention, various systems and methods for live IVR system crawling, such as to rapidly navigate and document a production IVR system.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
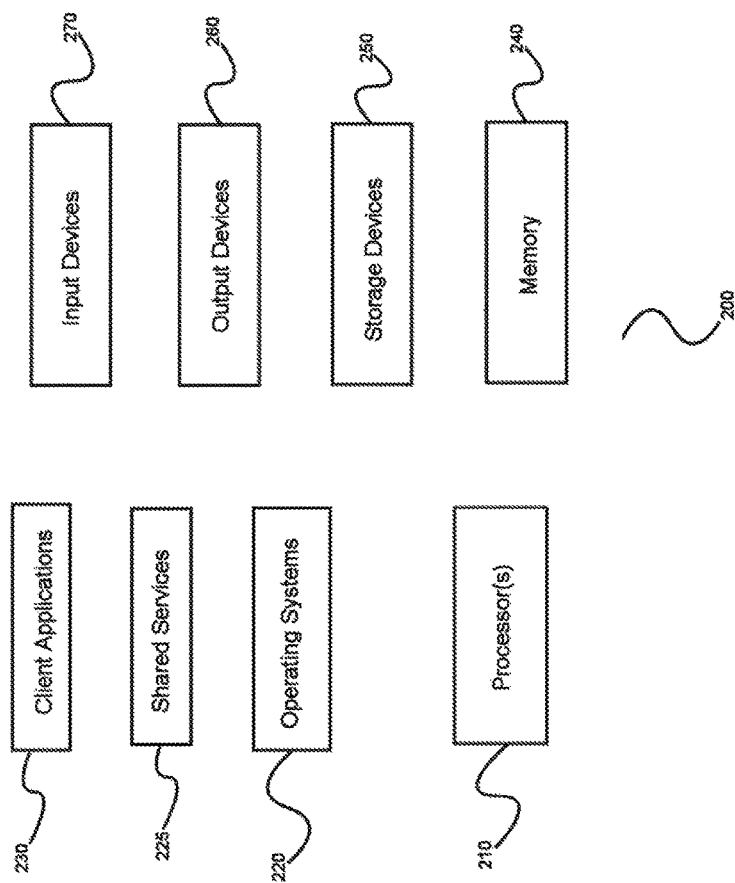
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
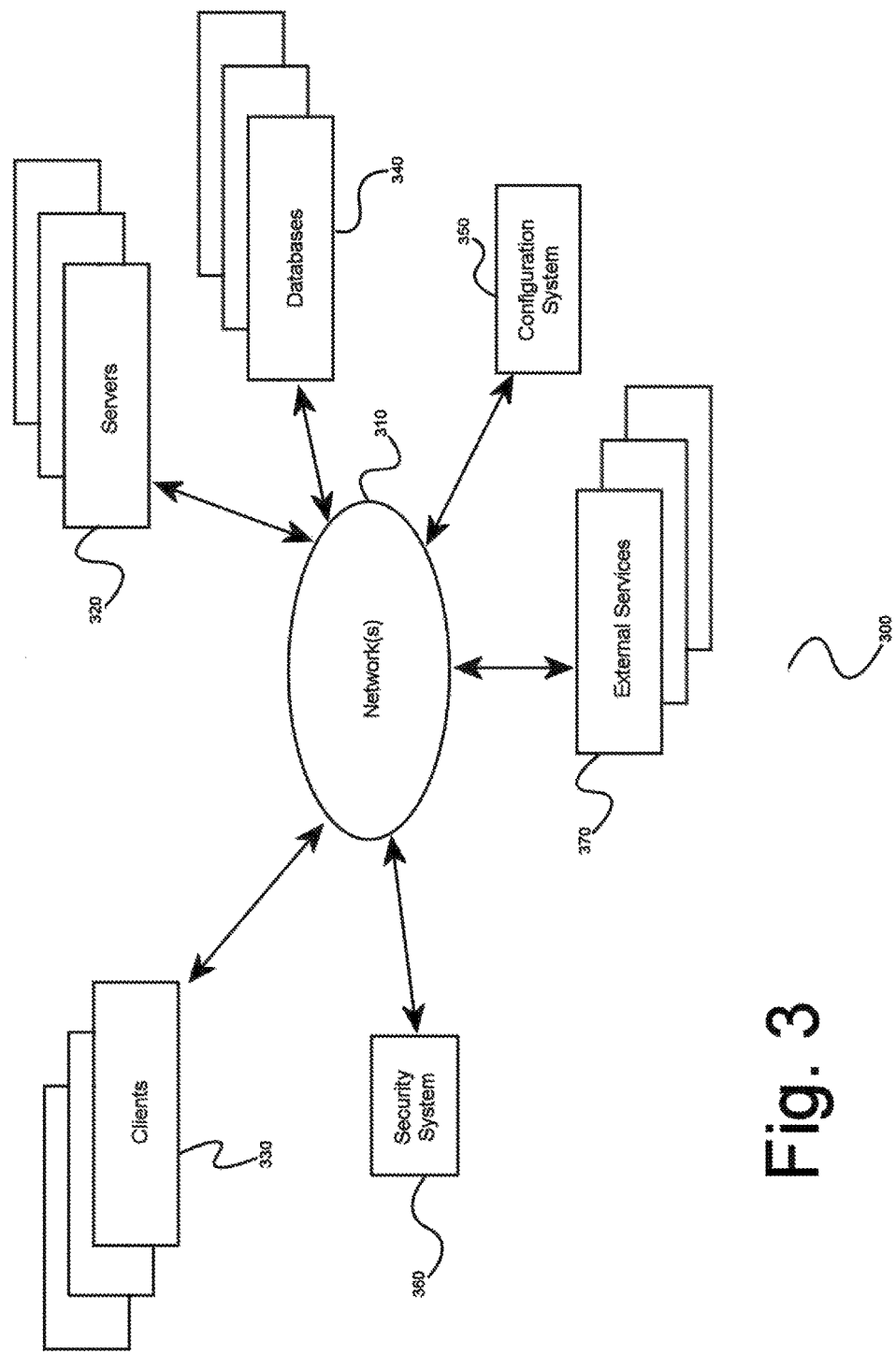
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
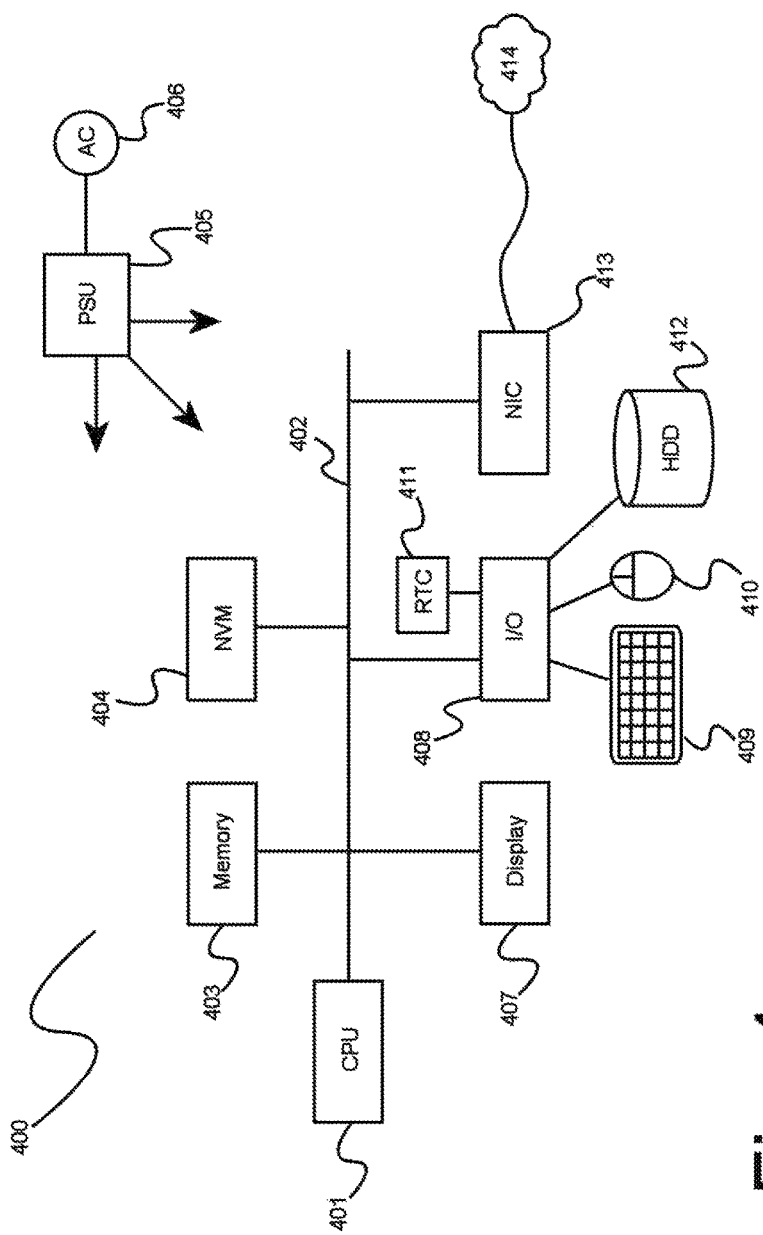
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
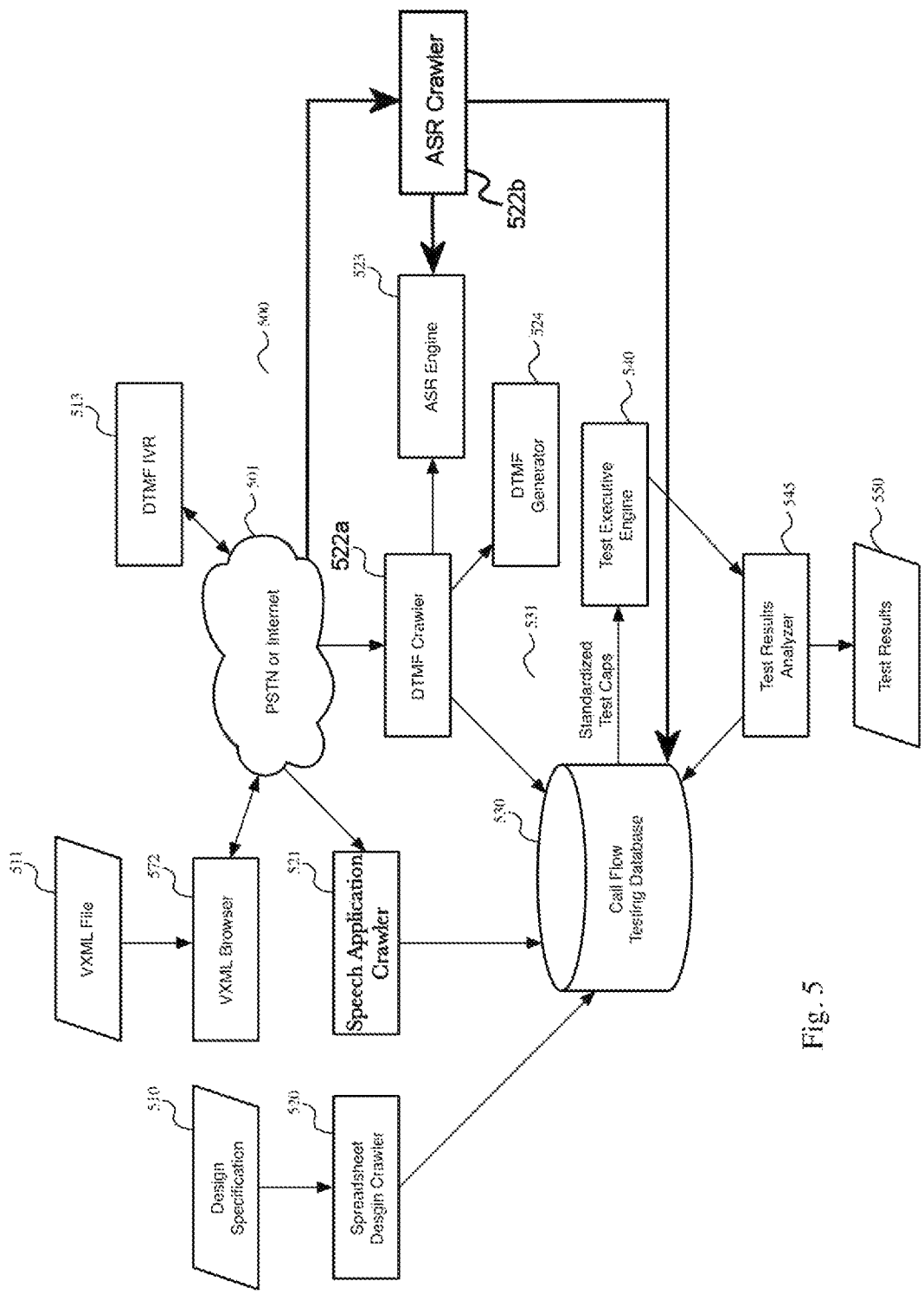
FIG. 5 is a block diagram illustrating an exemplary system architecture for IVR crawling, according to a preferred embodiment of the invention.

FIG. 5 is a block diagram of an exemplary system 500 for IVR crawling comprising a speech crawler 521 that may be a VXML-based crawler stored and operating on a network-connected computing device (such as a server or a desktop workstation), an IVR crawler that may be a dual-tone multifrequency (DTMF) crawler (DC) 522*a* (for example, a touch-tone based interaction program or ASR/NLSR speech application crawler (ASC) 522*b* that may be an automatically generated utterance based interaction program (as may be utilized interchangeably or simultaneously, according to the nature of the audio input received or operation being performed), a design crawler 520 that may be a spreadsheet-based software crawler, a call flow database 530 that may store and provide call flow documentation or records such as those generated by the crawlers of the invention, a test executive engine 540 that may perform call flow testing according to known call flow records, and a test results analyzer 545 that may perform analysis of the results of performed call flow tests such as to determine the performance of an IVR or the accuracy of a call flow documentation record, is disclosed. According to the embodiment, a speech application crawler (SAC) 521 may be a process that interrogates a target VXML browser 572, may then reverse engineer any discovered call flows (as described below) by parsing each branch of the VXML application (such as by providing all possible inputs at all possible layers) and builds a complete test case library. The input may be the URL of the target VXML file 511 and the output may be a file containing the test cases in XML format, such as for storing in a database or adding to documentation files.

A DTMF crawler (DC) 522*a* may be a process that interrogates a target touch tone IVR or IVRs 513 that aren't VXML compliant (or whose VXML interface is not accessible) by placing actual telephone calls to an IVR 513 from the crawler platform via a telephone network 501 such as a public switched telephone network (PSTN) or cellular network such as a GSM or CDMA radio communications network. The crawler may then, as described previously, reverse engineer any discovered call flows such as by parsing each and every branch of the application by providing all possible DTMF inputs via a DTMF generator 524 (such as may be utilized to generate DTMF tones to signal a telephone input without requiring a physical key press, as is appropriate for software-based applications) at all possible layers, and may then build a complete test case library. This solution includes use of transcription to convert audio to text for the test cases, for example by utilizing an automated speech recognition (ASR) engine 523 so that the software-based crawler may parse and respond to heard voice prompts from the IVR via the telephone call. The input may be a phone number, or multiple numbers (internal or external, such as for testing internal IVR applications or remotely testing external IVRs from outside the internal telephone network), and the output may be a library of test cases or a diagrammatic representation of the IVR application structure suitable for adding to documentation or storing in a database.

An ASR/NLSR speech application crawler (ASC) 522*b* may be a process that interrogates a target ASR/NLSR speech-based IVR or IVRs 513 that aren't VXML compliant (or who's VXML interface is not accessible) by placing actual telephone calls to an IVR 513 from the crawler platform via a telephone network 501 such as a public switched telephone network (PSTN) or cellular network such as a GSM or CDMA radio communications network. The crawler may then, as described previously, reverse engineer any discovered call flows such as by parsing each and every branch of the application by providing all possible DTMF inputs via a speech utterance (Text to speech) generator 524 (such as may be utilized to generate simulated customer spoken utterances without requiring a live human speaker, as is appropriate for software-based applications) at all possible layers, and may then build a complete test case library. This solution includes use of transcription to convert audio to text for the test cases, for example by utilizing an automated speech recognition engine 523 so that the software-based crawler may parse and respond to heard voice prompts from the IVR via the telephone call. The input may be a phone number, or multiple numbers (internal or external, such as for testing internal IVR applications or remotely testing external IVRs from outside the internal telephone network), and the output may be a library of test cases suitable for adding to documentation or storing in a database.

A design crawler 520 may be a process that interrogates a standard speech application design template 510 used commonly in the art to build a complete library of test cases for the speech/DTMF application. In such an arrangement, the crawler may traverse a design document 510 such as a spreadsheet, and as described previously may reverse engineer any discovered flows from the document and output a test case library suitable for incorporation into either a database or IVR documentation, or both.

According to the embodiment, a crawler may perform reverse-engineering of call flows discovered during operation, generally by interacting with an IVR system to explore available call flow options, identify menu prompts, or identify call flow endpoints (for example, when an IVR directs a caller outside of the IVR system, such as to a contact center agent or a voice recording system to leave a message). For example, a DTMF crawler (as described above) may place a call to an IVR by dialing an access number as a customer would. Upon reaching the IVR, the crawler may record a menu prompt, and identify available options such as through integration with ASR engine 523 to infer choices for input (for example, "for department A, press 1"). The crawler may then provide input corresponding to a menu choice, for example by producing the audio tones appropriate to simulate a numerical key press on a telephone handset. This operation may continue throughout a call flow by listening to a menu prompt, identifying available choices, inputting a choice, and listening to a new prompt as the crawler progresses through an IVR system. When an endpoint is reached, such as when a call is routed to an agent or other system external to the IVR, the crawler may conclude that particular call flow, document it appropriately (such as by producing VXML data, human-readable documentation describing the call flow, or providing data for use in a test case as described below), and may then optionally call back to the IVR and continue traversing the call flows by selecting new input choices. For example, an entire IVR system may be traversed in this manner by iteratively selecting the next available choice for each menu prompt, starting with the last menu (as may be identified from a previous call flow, by recognizing when the call flow ended and the call was routed, and identifying the menu prompt immediately prior to that as the "last" one). In this manner, some or all of an IVR system may be reverse-engineered efficiently and automatically. Another exemplary arrangement for reverse-engineering using VXML data is described below, referring to FIG. 7.

As illustrated, a test executive engine 540 may execute test cases based at least in part on stored or received input from the various IVR crawlers of the invention, and may present the results of test execution to a test results analyzer 545 for analysis. The resulting analyzed test results 550 may then be presented for review such as by a human analyst, or for storage in a database for further review at a later time or for future incorporation into addition analysis operations.

It should be appreciated that the system of the invention may incorporate multiple crawlers and crawler types such as those described above, interchangeably or simultaneously as may be desirable for a particular arrangement or application.

For example, a contact center with a number of IVR applications already in place may need to document their call flows and introduce test cases to audit operation. In such an arrangement, one or more types of IVR crawlers may be utilized to traverse and document an existing IVR setup from scratch, generating new documentation and test cases during operation. Similar approaches may be used to add documentation or test cases where previously there were none, allowing the documentation and testing of "in-place" or production systems, with no prior documentation needed.

In another exemplary arrangement, a contact center may wish to migrate to a new IVR system, for example during a change of ownership or locale, or a system upgrade. In such an arrangement, the contact center may utilize one or more types of IVR crawlers to traverse and document an existing IVR configuration, so that they may use this documentation as a starting point for rebuilding after the migration. Additionally, a crawler may be used to produce a plurality of VXML data describing the existing configuration, and suitable for importation into an IVR system. During the migration operation, this VXML data may then be imported into the new IVR system, effectively cloning the previous configuration in the new system and greatly expediting the overall migration process. Optionally, the new system may be audited using test cases or documentation produced prior to migration, ensuring the migration did not introduce any errors or corrupt data.

In another exemplary arrangement, a number of IVR crawlers may be used by a contact center in a continuous operation to continually or periodically traverse an IVR system, producing documentation for any changes as they are found. In such an arrangement, crawlers may keep IVR documentation current with regard to the state of an IVR configuration, for example to reflect changes made to menu prompts that might affect call flows. Additionally, test cases may be kept up-to-date as well, ensuring that changes made to call flows do not break testing operations unexpectedly, as well as ensuring that test cases may be used to audit any new changes.

DETAILED DESCRIPTION OF EXEMPLARY EMBODIMENTS

Figure 6:
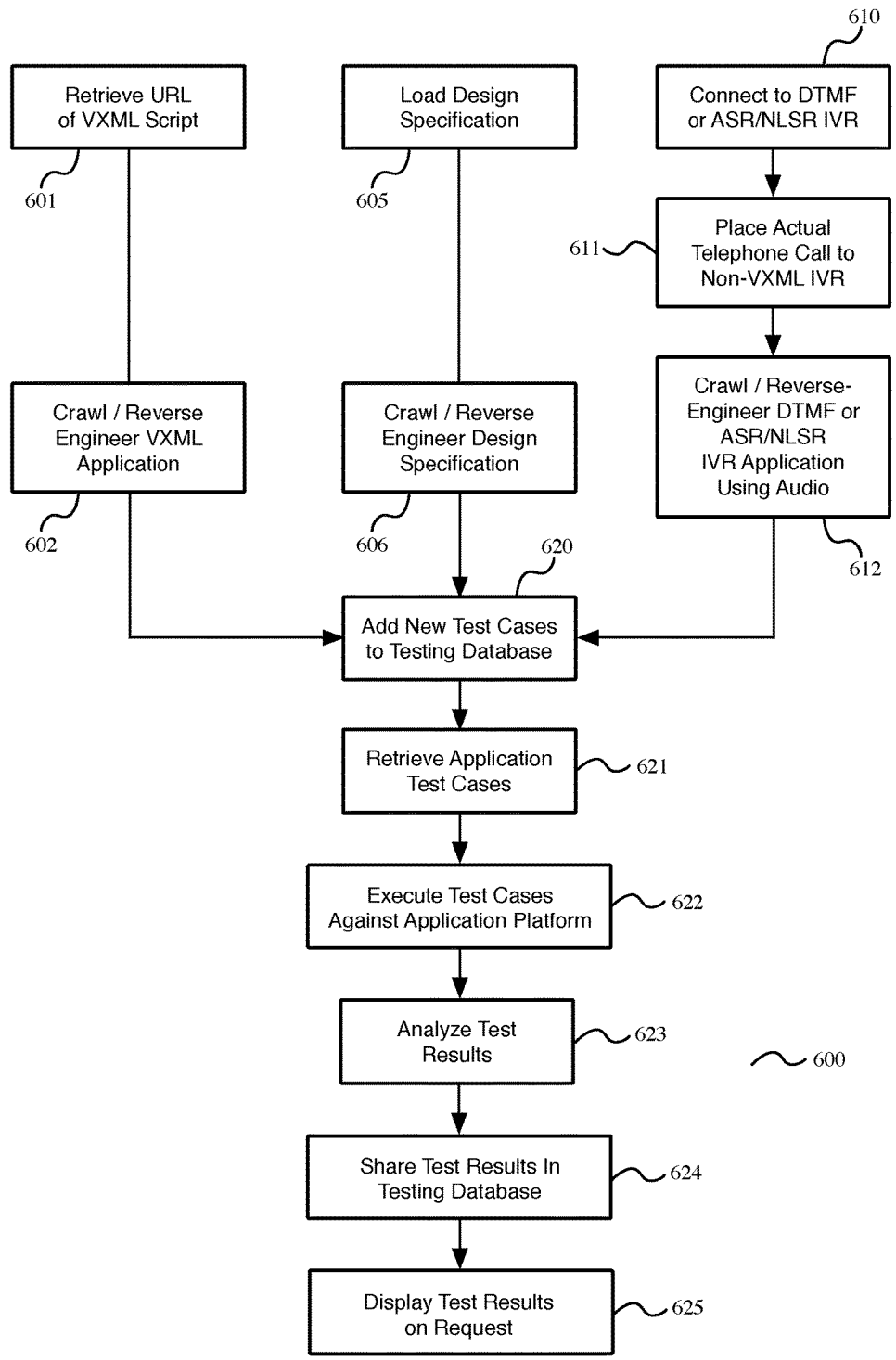
FIG. 6 is a method flow diagram illustrating an overview of an exemplary overview method for IVR crawling, according to a preferred embodiment of the invention.

FIG. 6 is a method flow diagram illustrating an exemplary overview method 600 for reverse engineering an IVR using a plurality of IVR crawling software applications such as those described previously, is disclosed. According to the embodiment, the method may utilize various IVR crawlers such as those described in the system of the invention above, for example crawlers that may be VXML, DTMF, or design-based in nature or operation. In an initial step, a crawler may access IVR information according to its specific nature, such as a VXML-based crawler loading a VXML script such as from a URL or stored file 601, a speech application crawler 521 loading a design specification 605, or a DTMF or ASR/NLSR Speech-based crawler connecting to an IVR 610 and placing a telephone call directly to an IVR system 611. In a next step, the crawler may crawl, or traverse, the IVR information according to its specific nature in order to reverse engineer an IVR application, such as by reverse engineering a VXML document 602, a design specification 606, or by using DTMF or spoken utterance (such as actual live or recorded human speech or automatically-generated artificial speech such as from a text-to-speech generator utilizing a script) audio to traverse the conversation paths of an IVR 612. In a next step 620, the crawler may then add new call test cases to a testing database, and in a next step 621 stored test cases may be retrieved by a test case execution engine, which may then execute the test cases in a next step 622. In a next step 623, the results of test case execution may be analyzed, and these test results may then be stored in a database for further reference in a next step 624. In an optional final step 625, test results may be presented for manual review, such as by a human analyst performing tests manually or reviewing the results of prior tests to review operation.

Figure 7:
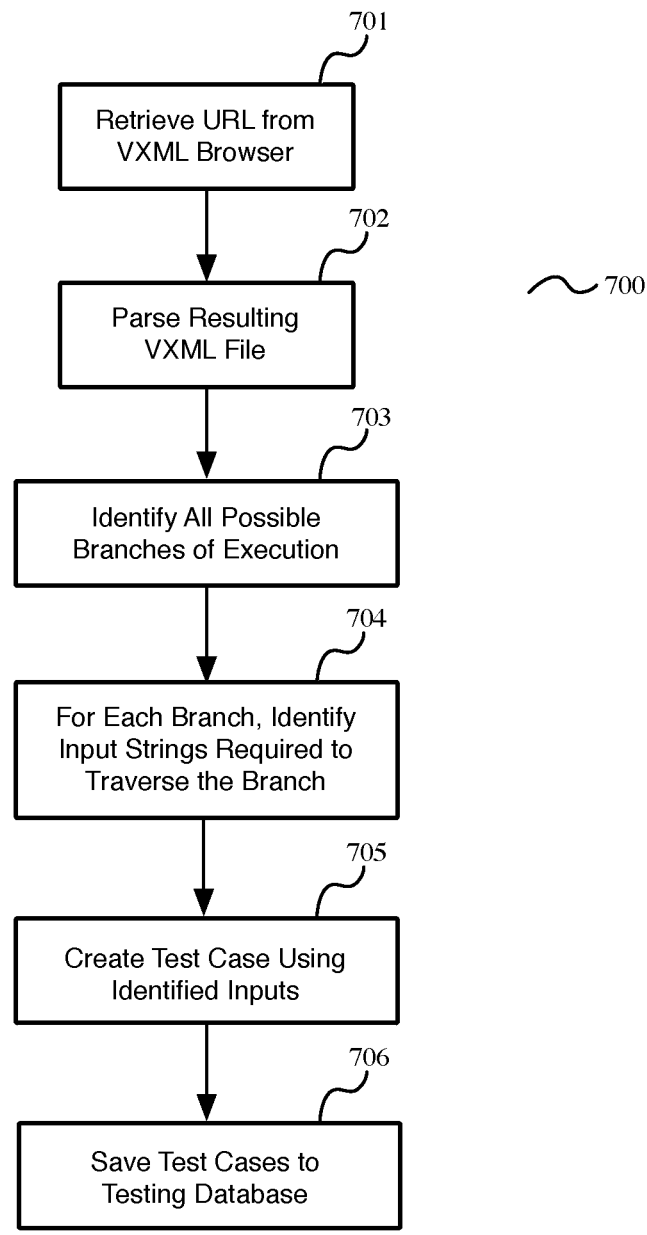
FIG. 7 is a method flow diagram illustrating an exemplary detailed method for reverse engineering a VXML document using a VXML crawler according to the invention.

FIG. 7 is a method flow diagram illustrating an exemplary detailed method 700 for reverse engineering a VXML document using a VXML crawler according to the invention. In an initial step 701, a crawler may retrieve a URL linking to a VXML file from a VXML browser, and in a next step 702 may parse the linked VXML file after retrieval. In a next step 703, the crawler may proceed to identify all possible branches of execution, such as by parsing the VXML file to identify points at which the IVR would present a choice, wherein a variety of inputs may be received from a customer (or other caller to the IVR system) and each input corresponds to a different possible choice leading down a conversation path through the IVR menu. In a next step 704, the crawler may identify what input strings may be required to traverse the branches found. In a next step 705, the crawler may now create a test case using the identified inputs, such that execution of the test case would effectively navigate a particular path through the IVR menu such as by waiting for an input prompt indicating a branch, then supplying the required input to traverse the branch down one path and so on until the end of execution when there are no more branches and the end of the IVR menu has been reached (such as would generally result in a caller being connected with a contact center agent or given further instructions for assistance outside of the IVR, for example a specific number or web address to pursue further help). In a final step 706, the resulting test cases may be stored in a database for future reference.

Figure 8:
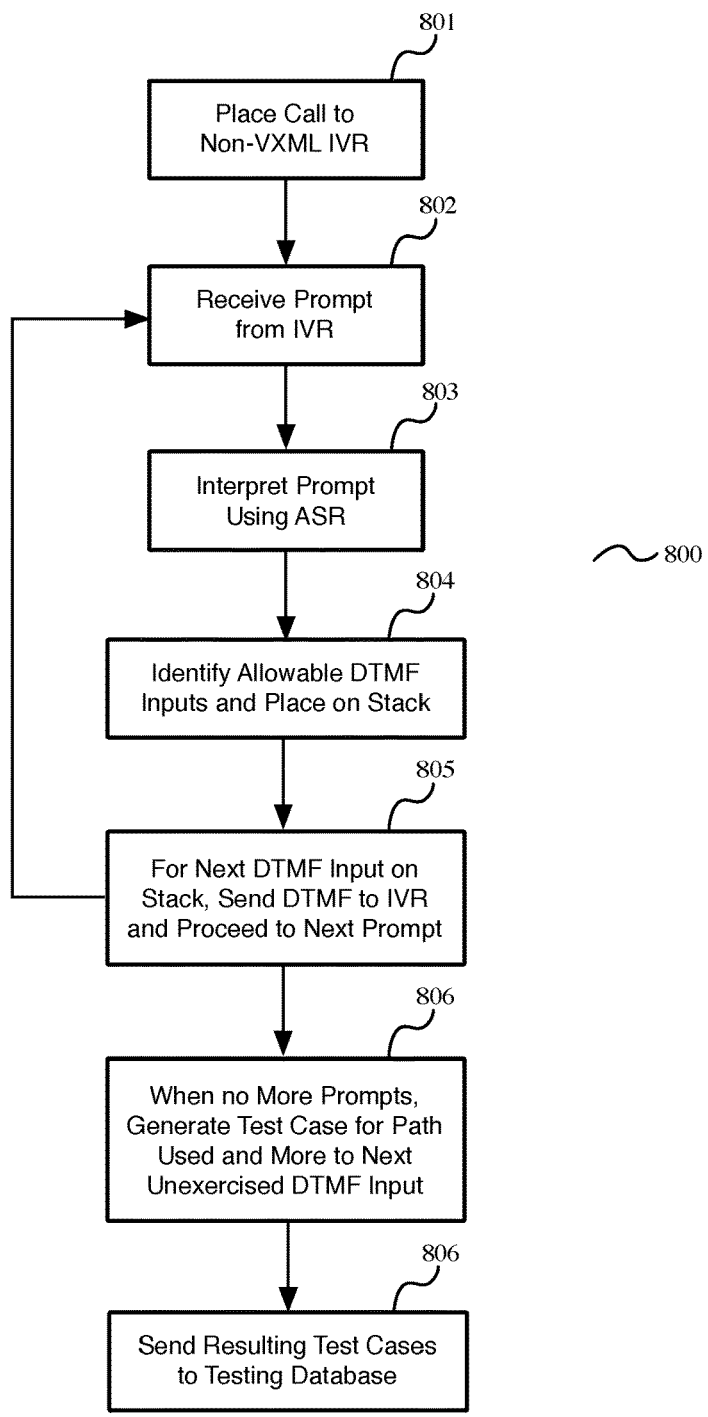
FIG. 8 is a method flow diagram illustrating an exemplary detailed method for interacting with an IVR through DTMF or speech-based audio using a suitable crawler according to the invention.

FIG. 8 is a method flow diagram illustrating an exemplary detailed method 800 for interacting with an IVR through DTMF or speech-based audio using a DTMF or ASR/NLSR Speech crawler according to the invention. In an initial step 801, a crawler may place a telephone call to an IVR system, such as via a PSTN or Internet-based connection such as any of a number of voice over IP (VoIP) services supporting DTMF tone-based or spoken utterance input. In a next step 802, the crawler may receive a prompt for input from the IVR, such as a caller would normally hear a voice prompt instructing them of a choice to continue navigating the IVR menu (such as "press 1 for technical support, or press 2 for account services", or for a speech application "for technical support say support for account services say accounts" for example). In a next step 803, the crawler may process this prompt using automated speech recognition (ASR), such as to identify what is being spoken by the IVR menu prompt in order to process it. In a next step 804, the crawler may identify allowable DTMF or speech utterance inputs, such as (continuing the previous example) identifying that the key presses "1" and "2" (or for speech, "support" or "accounts", for example) are possible input choices for this particular prompt. The crawler may then add these input choices to a processing stack, such that possible inputs may be stored along with their corresponding prompts in the order in which they were encountered, to facilitate orderly traversal of the IVR menu system during operation. In a next step 805, the crawler may retrieve the next DTMF or speech utterance input on the stack (such as, in the case of this example, the tone corresponding to the key press "1" or say "support"), and supply the corresponding DTMF tone input to the IVR system such as to trigger the menu prompt and continue traversing the menu path. While additional prompts are encountered, operation may continue in a looping or iterative fashion from a previous step 802, such that the crawlers may continue to receive and process audio prompts from the IVR, identify appropriate DTMF or speech utterance inputs and place them on the stack, and supply the next input to proceed through the IVR menu prompts encountered. When no more prompts are encountered (such as when the crawler reaches the end of an IVR menu path), in a next step 806 the crawler may generate a test case for the path used based at least in part on the prompts encountered and inputs supplied, and may then proceed to the next DTMF or speech utterance input on the stack and continue down a new menu path through the IVR. In a final step 806, the crawler may send resulting test cases to a database for storage and future reference. It should be appreciated that test cases may be sent individually as they are completed (such as while the crawler is still traversing additional IVR paths for new cases), or they may be sent all at once in a bulk operation once all possible IVR paths have been exhausted and operation is complete.

Figure 9:
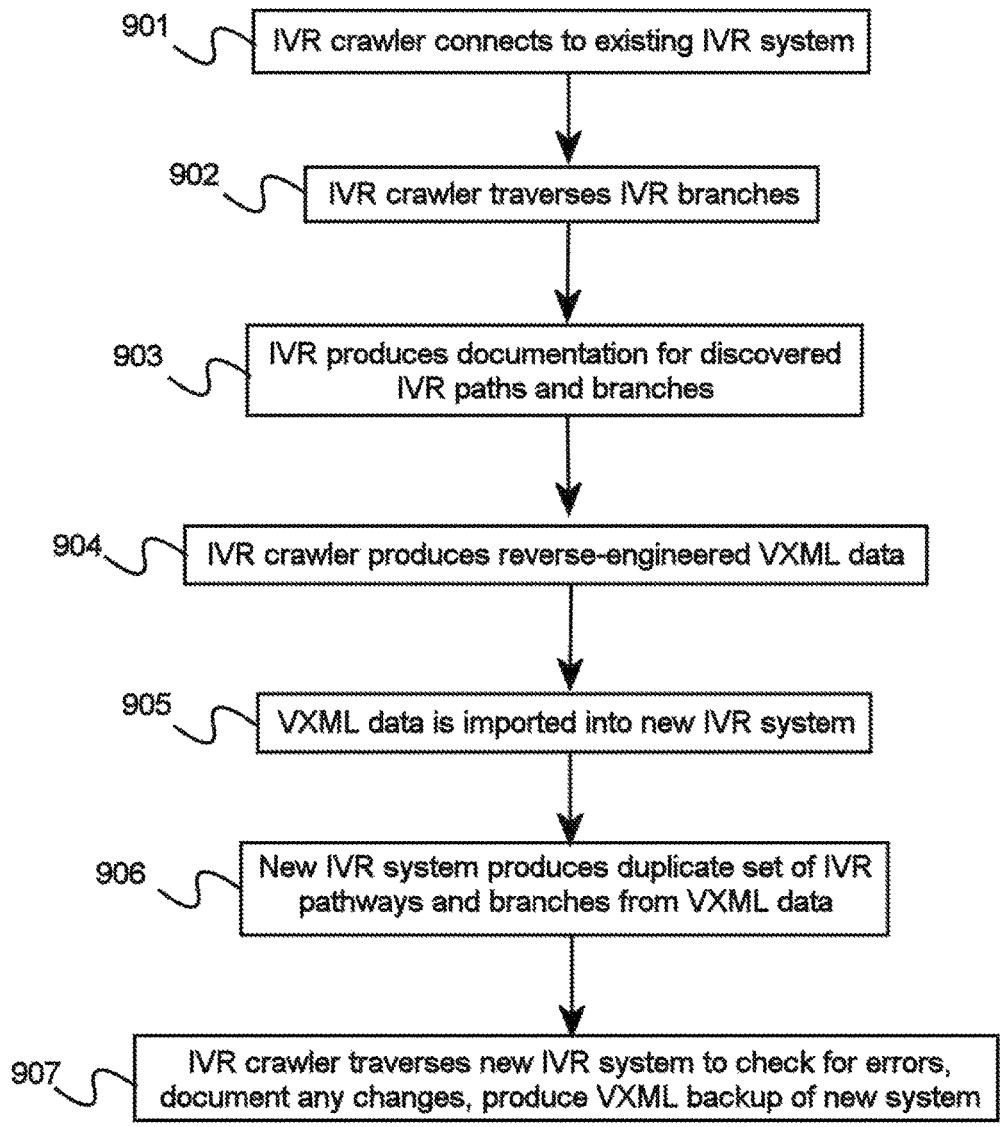
FIG. 9 is a method flow diagram illustrating an exemplary method for using an IVR crawler to perform a system migration, according to a preferred embodiment of the invention.

FIG. 9 is a method flow diagram illustrating an exemplary method 900 for using an IVR crawler to perform a system migration, according to a preferred embodiment of the invention. In an initial step 901, an IVR crawler may connect to an existing IVR system. Connection may vary according to a particular arrangement or use, such as using a DTMF crawler to dial a number and interact with an IVR system via tone-based dialing. In a next step 902, the IVR crawler may traverse available IVR branches and dialogue options, for example in a DTMF arrangement, a crawler may listen to a voice prompt, then provide input corresponding to a number pressed on a telephone keypad, progressing through an IVR system in a manner similar to an actual caller. In a next step 903, the IVR crawler may produce documentation of discovered IVR details, for example producing human-readable text documentation describing voice prompts heard (such as using speech-to-text translation, for example), or generating an interactive graphical map of an IVR system (as ids described below, referring to FIG. 10). In a next step 904, the crawler may produce a plurality of reverse-engineered VXML data describing a traversed IVR system, generally suitable for use in importing into an IVR system, for example to migrate existing IVR data to a new system (for example, when upgrading to a new IVR system) or for use as an IVR backup (for example, in case it is necessary to restore a copy of an IVR system, such as to recover from a failure or to deploy additional instances of duplicate IVR systems). In a next step 905, produced VXML data may be imported into a new IVR system, optionally overriding any pre-existing data (for example, to clear an unwanted IVR configuration and setup a new system as a copy of a previously-crawled system). This may be used to deploy additional instances of duplicate IVR systems, such as for an IVR content provider delivering pre-existing configurations for clients to rapidly deploy IVR systems, or for use in migrating an existing IVR configuration to a new system as an upgrade or replacement. In a next step 906, a new IVR system may parse imported VXML data and produce a duplicate set of IVR branches, dialogue trees, and other configuration, creating a functional duplicate of a previously crawled IVR system. At this point a new IVR system may be ready for deployment and fully functional, having similar configuration to a previously crawled system, or in an additional optional step 907 an IVR crawler may then be used to traverse the new IVR for example to document any changes, check for errors, or produce new VXML such as for backup purposes.

In this manner an existing IVR system may be crawled and parsed, producing not only documentation and test cases as described previously, but also a functional set of VXML data that may be suitable for use in duplicating or restoring an IVR system in full or in part. VXML data may be used to store backup copies of an IVR system, for example to maintain historical snapshots of an IVR in case of failure (for example, if a change is made that breaks a dialogue tree or causes other operational issues, a backup may be restored to rapidly repair function while the issue is diagnosed). VXML data may also be suitable for importing into an IVR system, generally for use in duplicating some or all of an IVR configuration such as to migrate to an upgraded system or to overwrite one IVR with another. For example, a company may wish to upgrade to an improved IVR system, and rather than manually configure an IVR and try to match a known desirable configuration, an existing IVR may be cloned or duplicated and loaded into the new system according to the embodiment. Another example may be a testing arrangement, wherein multiple IVR configurations may be deployed simultaneously and monitored. After determining a suitable or "most desirable" configuration based on measured performance results, VXML data created from crawling the desirable configuration may be used to overwrite and replace other configurations that were used in testing, such that only the desirable configuration remains in operation.

Figure 10:
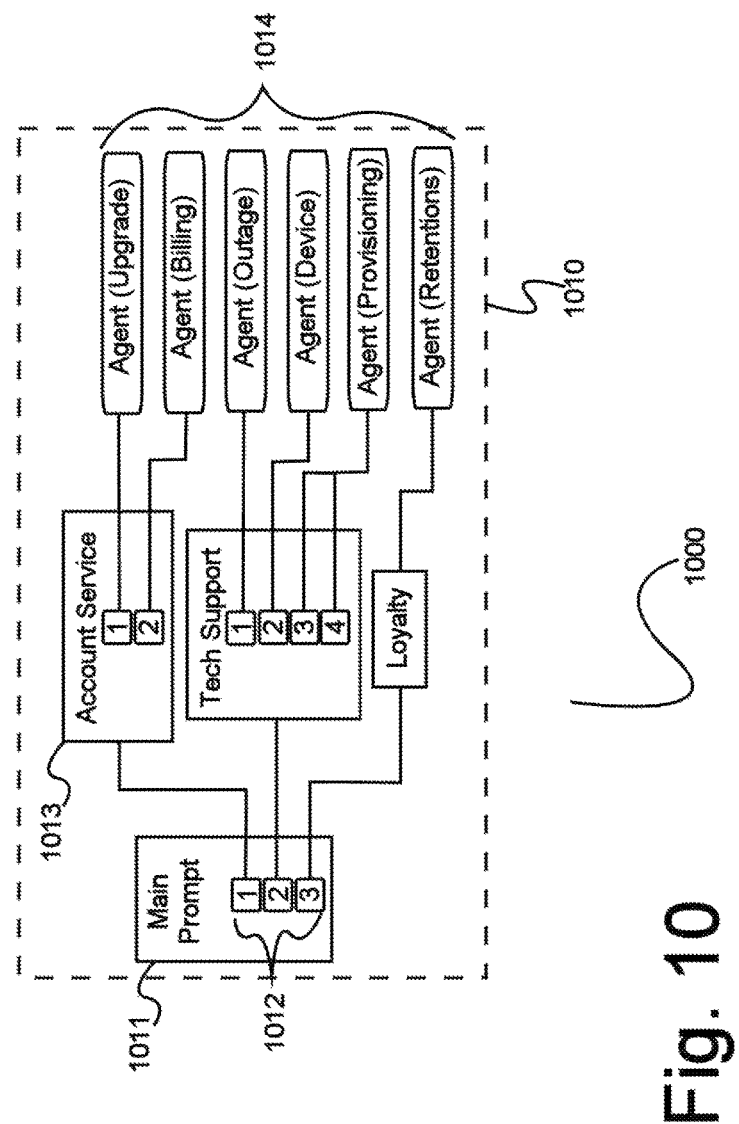
FIG. 10 is an illustration of an exemplary user interface for browsing an interactive IVR map, according to an embodiment of the invention.

FIG. 10 is an illustration of an exemplary user interface 1000 for browsing an interactive IVR map 1010, according to an embodiment of the invention. According to the embodiment, an IVR crawler may produce a map 1010 to document an IVR system, for example so that a user may easily view dialogue trees and options in an easily-understood format, and may visually identify areas for improvement such as incomplete trees or outdated or incorrect options. A graphic may be displayed to identify a main prompt 1011 or root-level dialogue, for example generally the first prompt that is heard when dialing into an IVR, and a plurality of available options 1012 for a user to select may be displayed, for example in a nested manner inside a graphic for a main prompt 1011. It should be appreciated that the specific visual nature or arrangement of menu prompts and selection choices may vary according to the embodiment, and the arrangements described and illustrated are exemplary and intended to provide adequate clarity. A plurality of additional menu prompts 1013 may be indicated, and may be arranged to indicate their respective position in a dialogue tree relative to preceding prompts (for example, in a left-to-right or top-to-bottom fashion). Each menu prompt may be displayed with a plurality of particular selection choices 1012 that may correspond to choices available to a caller after listening to the prompt, such that a visual arrangement may indicate relationships between menu prompt and their corresponding selection choices, and between selection choices and the following prompts they may lead to if chosen. A plurality of endpoints 1014 may be displayed, indicating termination of a dialogue tree when a caller reaches that level in the IVR. For example, after making a number of selections to indicate a call's purpose, a caller may be connected with a contact center agent to resolve their issue, as may be indicated by an endpoint according to the embodiment. Further according to the embodiment, it may be possible for a number of prompts, selection choices, or dialogue endpoints to be indicated along with a text-based description or summary of their corresponding audio content (as may be presented to a caller during interaction with an IVR system), generally so that a user viewing a map 1010 may readily understand what a caller might hear at any particular point in a tree during interaction with an IVR, as well as may notice dialogue errors such as outdated description or mistakes in vocabulary or grammar. Additionally, it may be possible for displayed prompts, selections, or endpoints to be presented with visual indicia indicating connections, for example to indicate "when a caller presses the number 1, it leads them to this specific menu prompt" and other direct correlations to indicate a dialogue flow. In this manner, a user may readily see how a call into an IVR may progress through a dialogue path, as well as be made aware of any problems with a call flow such as selection options that lead to an endless loop, or options that result in a call being dropped rather than properly routed, or any other such routing issues that may arise in an IVR system.

According to the embodiment, an IVR map 1010 may be interactive, enabling a user viewing map 1010 to browse in a manner suited to their individual preference or purpose (such as increasing or decreasing a level of detail in information presented, or to view specific areas of a map to inspect particular dialogue options or pathways, for example) immediately take action based on the information presented. For example, if a mistake in a dialogue prompt (such as an outdated description or incorrect vocabulary) is seen, a user may correct the issue through direct interaction with map 1010. An IVR crawler producing a map 1010 to document an IVR system may also produce a plurality of VXML data corresponding to the information being presented in map 1010, and a live or real-time correlation between the two may be enforced by an IVR system such that a change via an interactive map may be processed, corresponding VXML may be updated to match the change, and the modified VXML may be imported into an IVR system (as described previously, referring to FIG. 9) to enact the change in an operational IVR system. In this manner, users may be empowered to maintain or modify an IVR system without the need for specialized training or any level of familiarity with an IVR system, and any changes may be seen in an easily understood graphical context, making the results of a change apparent to prevent unpredicted complications.

According to the embodiments described above, referring to FIGS. 7-10, the particular operation or configuration of an IVR crawler or a particular crawling operation may be made interactive or configurable by a human user, in addition to an interactive map after a crawling operation is completed (as described in FIG. 10). For example, a software interface may be provided, such as via a web interface accessible using a web browser software application on a user's device, that may provide a variety of configuration or interaction options so that a user may direct an IVR crawling operation or configure general operation for an IVR crawler. Exemplary configuration options may include selecting a particular crawler type (such as DTMF or ASR) or a particular crawling operation mode (such as "document only", or "document and test", for example to select what forms of reverse-engineering, output, or IVR traversal should be performed), setting a dialing number (for example, a number used to dial in and reach an IVR system for crawling), selecting a language (for example, to improve ASR operation), or setting a phone number for a crawler to emulate, for example when interacting with an IVR that ordinarily would expect a phone number to be provided from a caller's device. A user may also configure keyword or phrase-based substitution rules, such as replacing the acronym DTMF with a phonetic pronunciation "dee-tee-em-eff", for example to aid ASR operations. Notifications may be configured, for example by setting an email address or other contact information, so that a user may be notified when a crawling operation is completed or if an error occurs. Additionally, a crawl depth may be configurable, to configure how many levels of menu options a crawler should examine before terminating an operation, for example to ensure that a crawler only tests a main menu prompt to test a recent change to the main prompt without spending extra time or resources testing further menu prompts that have not been changed.

The skilled person will be aware of a range of possible modifications of the various embodiments described above. Accordingly, the present invention is defined by the claims and their equivalents.

What is claimed is:

1. A system for interactive voice response system crawling, comprising:
an IVR crawler comprising at least a plurality of programming instructions stored in a memory and operating on a processor of a network-connected computing device, and configured to:
connect to an IVR system via a network;
traverse an IVR menu path by identifying a plurality of available IVR menu options as they are provided audibly by the IVR system and providing a plurality of input choices to the IVR system, the input choices produced based at least in part on the identified available IVR menu options, to progress through the menu;

produce a plurality of IVR test cases based at least in part on the sequence of prompts and inputs utilized in traversing a particular IVR menu path; and a database comprising at least a plurality of programming instructions stored in a memory and operating on a processor of a computing device, and configured to store test cases produced by an IVR crawler.

2. The system of claim 1, wherein the IVR crawler is a VXML-based crawler.

3. The system of claim 2, further comprising a VXML browser comprising a plurality of programming instructions stored in a memory and operating on a processor of a network-connected computing device, and configured to provide a plurality of VXML data to a VXML-based crawler via a network.

4. The system of claim 3, wherein the VXML-based crawler receives a plurality of VXML data from the VXML browser, and traverses an IVR menu path based in least in part on the received VXML data.

5. The system of claim 1, wherein the IVR crawler is a design-based crawler.

6. The system of claim 5, wherein the design-based crawler processes a design specification for an IVR.

7. The system of claim 1, wherein the IVR crawler is a DTMF-based crawler.

8. The system of claim 7, wherein the DTMF-based crawler connects to an IVR system by placing a telephone call via a telephony-based network.

9. The system of claim 8, wherein the DTMF-based crawler provides an input choice to the IVR system by generating a DTMF audio tone.

10. The system of claim 1, wherein the IVR crawler is an ASR/NLSR speech-based crawler.

11. The system of claim 7, wherein the ASR/NLSR speech-based crawler connects to an IVR system by placing a telephone call via a telephony-based network.

12. The system of claim 8, wherein the ASR/NLSR speech-based crawler provides an input choice to the IVR system by generating a plurality of speech utterance audio data.

13. The system of claim 9, further comprising an automatic speech recognition engine comprising a plurality of programming instructions stored in a memory and operating on a processor of a network-connected computing device, and configured to interpret menu prompts comprising audio data, and to provide interpretation result data to a DTMF or ASR/NLSR speech-based crawler.

14. The system of claim 1, further comprising a test case execution engine comprising a plurality of programming instructions stored on a memory and operating on a processor of a network-connected computing device, and configured to execute a test case produced by the IVR crawler.

15. The system of claim 11, wherein the test cases are received directly from the IVR crawler as they are produced.

16. The system of claim 11, wherein stored test cases are retrieved from the database.

17. The system of claim 11, further comprising a test results analyzer comprising a plurality of programming instructions stored in a memory and operating on a processor of a network-connected computing device, and configured to analyze the results of test case execution from the test execution engine.

18. The system of claim 14, wherein the analysis results are stored in the database.

19. The system of claim 14, wherein the results are provided to a human user for review.

20. A method for interactive voice response system crawling, comprising the steps of:

accessing, via an IVR crawler comprising at least a plurality of programming instructions stored in a memory and operating on a processor of a network-connected computing device, and configured to connect to an IVR system via a network and traverse an IVR menu path by identifying a plurality of available IVR menu options and providing a plurality of input choices to the IVR system to progress through the menu, and configured to produce a plurality of IVR test cases based at least in part on the sequence of prompts and inputs used to traverse a menu path, an IVR system;

reverse engineering the menu paths of the IVR system by identifying a plurality of available IVR menu options as they are provided audibly by the IVR system and providing a plurality of input choices to the IVR system, the input choices produced based at least in part on the identified available IVR menu options, to progress through the menu;

producing a test case based at least in part on the sequence of prompts and input choices used to traverse a menu path; and storing, in a database comprising at least a plurality of programming instructions stored in a memory and operating on a processor of a computing device, and configured to store test cases produced by an IVR crawler, the test case for future reference.

21. The method of claim 20, further comprising the steps of:

executing, via a test case execution engine comprising a plurality of programming instructions stored on a memory and operating on a processor of a network-connected computing device, and configured to execute a test case produced by the IVR crawler, the test case;

analyzing, via a test results analyzer comprising a plurality of programming instructions stored in a memory and operating on a processor of a network-connected computing device, and configured to analyze the results of test case execution from the test execution engine, the results of test case execution; and providing the analysis results.

22. The method of claim 20, further comprising the step of storing, in a database comprising at least a plurality of programming instructions stored in a memory and operating on a processor of a computing device, and configured to store test cases produced by an IVR crawler, the analysis results for future reference.

23. A method for interactive voice response system migration, comprising the steps of:

accessing, via an IVR crawler comprising at least a plurality of programming instructions stored in a memory and operating on a processor of a network-connected computing device, and configured to connect to an IVR system via a network and traverse an IVR menu path by identifying a plurality of available IVR menu options and providing a plurality of input choices to the IVR system to progress through the menu, and configured to produce a plurality of IVR test cases based at least in part on the sequence of prompts and inputs used to traverse a menu path, an IVR system;

reverse engineering the menu paths of the IVR system by identifying a plurality of available IVR menu options as they are provided audibly by the IVR system and providing a plurality of input choices to the IVR system, the input choices produced based at least in part on the identified available IVR menu options, to progress through the menu;

producing a plurality of VXML data corresponding to at least a portion of the menu paths of the IVR system; and importing at least a portion of the plurality of VXML data into an IVR system.

* * * * *